(12) United States Patent
Busse et al.

(10) Patent No.: US 6,714,900 B1
(45) Date of Patent: Mar. 30, 2004

(54) METHOD FOR GENERATING A SHELL MOLD FOR A CASTING

(75) Inventors: Frank Busse, Aachen (DE); Norbert Hofmann, Villigen (CH)

(73) Assignee: Alstom, Paris (FR)

(*) Notice: Subject to any disclaimer, the term of this patent is extended or adjusted under 35 U.S.C. 154(b) by 0 days.

(21) Appl. No.: 09/390,674

(22) Filed: Sep. 7, 1999

(30) Foreign Application Priority Data

Sep. 10, 1998 (DE) .......................................... 198 41 389

(51) Int. Cl.$^7$ ................................................. G06G 7/48
(52) U.S. Cl. ................................................. 703/6; 703/1
(58) Field of Search ..................... 703/6, 1, 2; 700/145, 700/146, 197, 97, 98; 29/228

(56) References Cited

U.S. PATENT DOCUMENTS

| | | | | |
|---|---|---|---|---|
| 3,816,898 A | * | 6/1974 | Odman ........................ | 29/730 |
| 4,641,270 A | | 2/1987 | Lalloz et al. | |
| 5,266,021 A | * | 11/1993 | Jacobson ..................... | 425/334 |
| 5,377,119 A | * | 12/1994 | Backer ........................ | 364/476 |
| 5,553,206 A | * | 9/1996 | Meshkat ...................... | 345/419 |
| 5,573,716 A | * | 11/1996 | Jacobson ..................... | 264/167 |
| 5,581,489 A | | 12/1996 | Groothuis et al. | |
| 5,868,194 A | * | 2/1999 | Horwood ...................... | 164/456 |
| 5,936,869 A | * | 8/1999 | Sakaguchi et al. .......... | 364/578 |
| 5,946,479 A | * | 8/1999 | Sakaguchi et al. ..... | 395/500.21 |
| 5,965,079 A | * | 10/1999 | Manners ...................... | 204/518 |
| 6,304,794 B1 | * | 10/2001 | Nishimine et al. .......... | 700/197 |

OTHER PUBLICATIONS

The Handbook of Mathematical Sciences 5th Edition, by William H. Beyer, CRC Press, 1978, ISBN 0-493-0655-8 p. 211-218* (trigonometric) and p. 452 scalar product.*

Blacker et al., "Paving: A New Approach to Automated Quadrilateral Mesh Generation", *International Journal for Numerical Methods in Engineering*, 1991, vol. 32, pp. 811-847, John Wiley & Sons, Ltd., Hoboken, New Jersey.

* cited by examiner

*Primary Examiner*—Hugh Jones
*Assistant Examiner*—Ed Garcia-Otero
(74) *Attorney, Agent, or Firm*—Burns, Doane, Swecker & Mathis, L.L.P.

(57) ABSTRACT

The invention describes a method for generating a shell mold for castings, in which the shell mold is described from a multiplicity of finite volume elements and/or surface elements which are connected to one another via node points and which together form a mesh points for describing the surface of the shell mold. First, the real surface geometry of the casting is recorded and generated in the form of a coherent base mesh. Then, an approximated simulation of the real surface geometry is complied by means of finite volume elements and/or surface elements. This is followed by the determination of in each case one shell node point for each node point contained in the base mesh and the generation of shell vectors and a new surface element which is positioned above each shell node point and in each case defines a volume element which, together with all the other newly formed volume elements, leads to a first layer of the shell mold. By means of iterative repetition of the last steps, a second and/or further layer of the shell mold is defined, until a desired, predetermined final thickness of the shell mold is reached.

11 Claims, 5 Drawing Sheets

METHOD FOR GENERATING A SHELL MOLD FOR A CASTING

BACKGROUND OF THE INVENTION

1. Field of the Invention

The invention relates to a method for generating a shell mold for a casting, in which the shell mold is described from a multiplicity of finite volume elements and/or surface elements which are connected to one another via node points and which together form a mesh, the so-called FE mesh, for describing the surface of the shell mold.

2. Discussion of Background

Methods of the generic type form the basis for the industrial manufacture of complicated castings of complex geometry which, since their use often places very considerable loads on the cast material, have to satisfy extremely high demands with regard to the casting quality. Of particular interest in this context is the production of turbine blades which, in the field of gas turbine engineering, are exposed to extremely high material loads at high pressure and temperature conditions. It is unquestionable that the service life of such castings is particularly dependent on the quality of their production, since in casting processes, in addition to the use of precisely formed casting molds, the cooling phase which follows the casting operation also has a considerable influence on the formation of mechanical stresses inside the casting. Both the geometry of the casting and the cooling operation are decisively affected by the design of the shell mold in which the casting itself is formed.

Thus, for the complex production of turbine blades, the production of ceramic shell molds using the so-called investment casting process has become established in the course of the last 25 yeas. This production process, which corresponds to a dipping process, makes it possible to produce shell molds with a variable wall thickness which is a function of the surface curvature of the casting. Starting from a pattern of a turbine blade which is made from a fusible material (e.g. wax), this blade is dipped into a liquid bath comprising refractory material which can solidify, so that a type of coating is deposited on the surface of the turbine blade. After the turbine blade has been removed from the bath, the coating which has been deposited on the surface of the turbine blade is hardened, so that the dipping operation can be repeated sufficiently often to produce a desired shell mold thickness. Finally, the shell mold which has been obtained in the manner described above is heated until the pattern turbine blade material (wax) is liquefied and is able to flow out of the shell mold.

Particular care has to be taken when producing such shell molds, since when the molten material solidifies in the shell mold, the thickness of the shell mold is the decisive factor in determining the heat flux through the turbine blade and therefore the casting quality.

Furthermore, it is possible to generate the shell molds in a theoretical, numerical fashion using finite elements (FE) which are suitable for simulating surface geometries.

To carry out an FE simulation, the casting is made into a mesh on the basis of technical drawings or CAD data. Thus, for the shell mold, detailed geometric data is available only in the main blade area of the turbine blade, and therefore it is possible to generate the shell mold in two separate working steps:

In the first step, a shell mold is generated manually on the main blade area of the blade which has been made into a mesh. There are two possibilities for doing this:

1. Surface elements which correspond to the surface of the shell mold are generated manually. Then, the volume mesh between the surface elements of the pattern casting mold and the manually generated surface mesh of the mold shell is generated automatically.

2. Volume elements are manually applied to the surface elements of the pattern casting mold, which volume elements describe the volume mesh of the shell mold.

These two steps are typically carried out using commercial mesh-generation programs (e.g. IDEAS SUPERTAB, CATIA, . . . ).

Exact compliance with the shell mold thickness in the main blade area requires time-intensive definition of the shell mold surface. In the root and head areas of the turbine blade, by contrast, the production process results in large shell mold thicknesses which are determined by the complex surface in this area. The large shell mold thickness in the root and head areas of the blade often results in surfaces of complex structure. These numerous complex surfaces cannot be manually machined from the surface geometry of the pattern. Therefore, complex geometries are simplified, to the detriment of the accuracy of the geometric description of the shell mold. In this case, commercial software is used to estimate the position and shape of the surface of the shell mold, which are correspondingly inaccurately described. Using the commercial software, firstly a surface element mesh of the shell mold is generated from the estimated, and therefore inaccurate, surface description of the shell mold. Then, a volume element mesh is automatically generated from the surface element mesh of the pattern and the shell mold.

By using automatic shell mold generators, on the basis of methods for producing three-dimensional objects using finite elements, as is disclosed, for example, from American patent U.S. Pat. No. 5,581,489, it is possible to considerably reduce the mesh-production outlay involved in the generation of shell molds for producing a gas turbine blade. It is thus possible, when producing the mesh for a gas turbine blade, to save roughly up to two man weeks compared to the traditional method of producing a mesh. At the same time, the accuracy of the details of the geometry description of the shell mold, and consequently the calculation accuracy of the finite element simulation, increase.

Due to the considerable potential for saving time when producing the mesh for shell molds, a number of attempts have already been made to develop automatic shell mold generators using finite element or control volume meshes. However, the known shell generators have the drawback that the shell generators do not take into account all aspects of the production process, in particular the dependency of the shell mold thickness on the curvature. Consequently, however, exact simulation of the precision casting process is not possible, since commercially available mesh generators do not take into account either the curvature or the orientation of the volume elements of the shell mold. Consequently, the accuracy of the temperature, stress and deformation simulation, and of the flow simulation of the casting and shell mold geometry, decreases significantly.

A key factor for the further development of gas turbine blades lies in the castability of the blade itself, a problem which, owing to the ever more complicated shapes of blades, is increasingly becoming the focus of gas turbine development. Conventional casting technology nowadays no longer allow relatively large blades to be cast without flaws.

The casting operation can only be evaluated and optimized by using numerical simulation of the casting process. However, optimization of a precision casting process requires from two to twenty variations or optimization steps in order to obtain a suitable geometry for the cast component and thus the ideal shell mold mesh. Therefore, rapid and accurate production of a mesh for the shell mold typically contributes 4–10 man weeks to reducing the development time for the casting process.

SUMMARY OF THE INVENTION

Accordingly, one object of the invention is to develop a method for generating a shell mold for a casting, in which the shell mold is described from a multiplicity of finite volume elements and/or surface elements which are connected to one another via node points and which together form a mesh, the so-called FE mesh, for describing the surface of the shell mold, in such a manner that the curvature characteristics of the casting are also taken into account when determining the shell mold, in that the thickness of the shell mold is to be designed as a function of the curvature characteristics of the casting and therefore of the shell mold.

In order to be able to individually modify the level of accuracy with which the shell mold is matched to the surface of the casting, the shell mold mesh on which the method is based is to be made coarser or finer. Furthermore, there should be possibilities for correction during the generation of the shell mold mesh, so that holes or recesses on the surface of the casting can be better taken into account, for example by closing holes, and it is also intended for it to be possible to recognize and eliminate impermissible volume elements which, for example, overlap one another. Finally, it is to be possible for the shell mold generator also to be used for other methods which require curvature-dependent layers.

The object on which the invention is based is achieved in accordance with claim 1. Features which refine the inventive concept form the subject matter of the subclaims.

According to the invention, a method in accordance with the preamble of claim 1 is refined by the combination of the following method steps:

Firstly, the real surface geometry of the casting is recorded and generated in the form of a coherent base mesh which is composed of surface elements which are defined and connected by node points. Auxiliary programs which are known per se and allow the FE geometry of the casting which is to be cast to be read in are suitable for this purpose. These data can also be imported from CAD systems, provided that the casting was designed on the basis of a CAD system.

Then, an approximated simulation of the real surface geometry of the casting geometry is produced by means of finite volume elements and/or surface elements, which form the FE mesh. The base node points which are contained in the base mesh and are assigned to one or more surface elements together, linked with the associated surface elements, define the surface of the casting mold.

Furthermore, for all base node points, so-called shell vectors are generated, which are oriented perpendicular to each of the surface elements which bear against the base node point and the length of which is in each case generated as a function of the curvature characteristics at the base node points and corresponds to the distance to a new surface element which is positioned above each base node point and in each case defines one volume element and/or new surface which, together with all the other newly formed volume elements and/or surface elements, leads to a first layer of the shell mold.

The end point of the shell vector imposed on the base node point defines the new shell node point.

By means of iterative repetition of the generation of shell vectors on base node points, taking into account the topology of the base node points, the newly generated shell node points from the previous generation step again defining a base mesh, the associated volume elements and/or surface elements of which define a further layer of the shell mold, the complete shell mold is gradually produced in the form of an onion-skin structure, which shell mold reaches a desired, predetermined final thickness as a function of its local curvature.

To form in each case one layer of the shell mold on the basis of the shell node points and the shell vectors which are to be formed as a function of the curvature characteristics, two differently operating modules are used:

| Model I: | Mapped Mesher | (volume element mesh production) |
|---|---|---|
| Model II: | Free Surface Mesher | (surface mesh production) |

While in the Mapped Mesher new volume elements are generated directly in order to form a shell mold layer, in the Free Surface Mesher only the new surface elements are generated. However, the generation of new elements in the Mapped Mesher can only be achieved if the surface is convexly curved (curved outward). A slightly concave curvature is only permissible if the radius of curvature is greater than the local shell mold thickness. If deformed elements are formed during the element generation, the shell mold generation is terminated in the Mapped Mesher.

In the case of the Free Surface Mesher module, the volume between the casting surface and the calculated shell mold surface is made into a mesh using tetrahedrons by means of commercially available software. This step is not necessary for the Mapped Mesher method, since new volume elements are generated directly at each extrusion step, i.e. at each formation of a new layer.

The following text describes, by way of example, the method sequence for the shell mold generation using the Mapped Mesher method.

The FE model which has been obtained using CAD data or has been synthesized by means of suitable auxiliary programs forms an approximated representation of the real geometry of the casting, for example the geometry of a turbine blade. Thus the casting volume is to be made discrete as accurately as possible by combining many individual volume elements, for example in the form of hexahedrons, pentahedrons and/or tetrahedrons. The corners of these elements, i.e. the so-called node points, determine the position of the individual elements and the three-dimensional links between them. Together, these elements and the associated node points form the so-called FE mesh (finite element mesh).

Since a shell mold around a body is determined not by its volume but by its surface, its surface in the FE model is represented by means of surface elements.

The smallest unit of the FE mesh is the node point. For each base node point of the base mesh, which corresponds to the casting surface or a shell mold surface which has already been generated in a previous step (iterative generation of the mold shell), the method according to the invention, with the aid of the directly adjacent node points, determines a shell node point. The shell node point defines a surface element of the shell mold with respect to each element of the base mesh. Moreover, each element of the base mesh, together with the associated surface element, defines a volume element of the shell mold. Together, these determined volume elements form the primary volume mesh or the first layer of the shell mold.

The primary volume mesh on a concave surface may therefore contain unusable elements. These are volume elements which intersect one another. With this in mind, the method is able to recognize invalid elements and intersections between allowed elements and to eliminate the invalid ones. The corrected shell is also to maintain a predetermined span of curves.

BRIEF DESCRIPTION OF THE DRAWINGS

Preferred embodiments of the invention are disclosed in the following description and illustrated in the accompanying drawings, in which.

DETAILED DESCRIPTION OF THE INVENTION

Referring now to the drawings, starting from the base mesh which is composed of a multiplicity oft base node points, the shell node points are obtained on the basis of both the desired thickness of the shell mold or of the layer to be produced, measured normally with respect to the surface of the original geometry of the casting, which in the base mesh is described as a planar surface element, and of the relative deviation from this thickness as a function of the curvature of the original geometry of the casting.

A shell node point $\vec{P}_{Si}$ at the base node point $\vec{P}_i$ of the base mesh results from the base node point $\vec{P}_i$ of the original geometry of the casting and its shell vector $\vec{S}_i$.

$$\vec{P}_{Si} = \vec{P}_i + \vec{S}_i \quad \text{(Eq. 1)}$$

The shell vector $\vec{S}_i$ runs in the direction of the normal $\vec{N}_i$ to the base node point $\vec{P}_i$ of the surface mesh, which corresponds to the base mesh. Its length results from the predetermined mean thickness D, which is selected to match the shell mold thickness of a real component, and a curvature formulation $K_i$ in the base node point $\vec{P}_i$. The thickness and therefore the length of the shell vector $\vec{S}_i$ at the base node point $\vec{P}_i$ is determined by means of the curvature factor $K_i$ (referred to below as curvature) at the base node point $\vec{P}_i$. The determination of the curvature $K_i$ at the base node point $\vec{P}_i$ is dealt with in more detail below.

The following applies for the shell vector $\vec{S}_i$:

$$\vec{S}_i = D(K_i)\vec{N}_i \quad \text{(Eq. 2)}$$

By means of experimental investigations of the shell mold thickness as a function of the curvature factor $K_i$, a clear correlation is produced between thickness and curvature, which correlation takes into account the physical properties of the production process and of the shell mold material. A table and/or graph is drawn up which illustrates the shell mold thickness D of a shell mold material as a function of the curvature which is still to be described.

Figure 1:
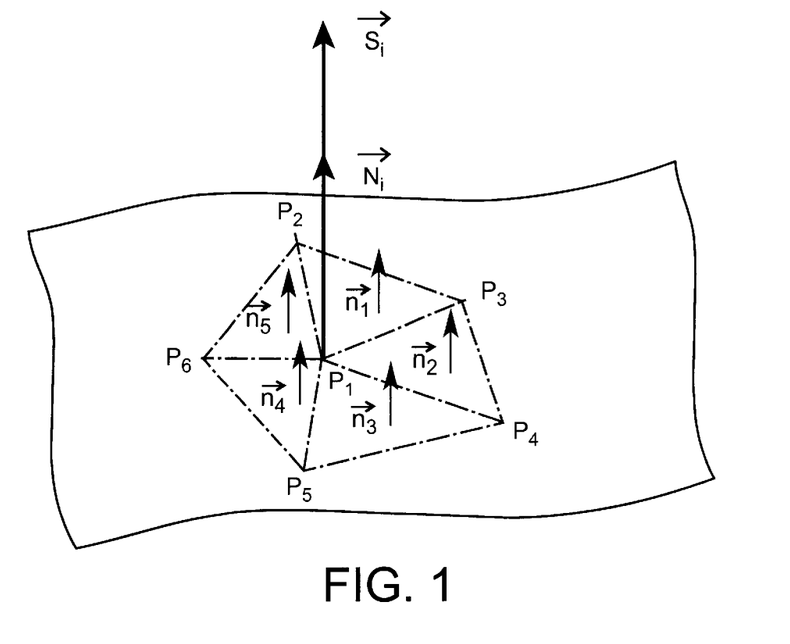
FIG. 1 shows a design illustration for defining a normal vector to a point $P_1$, FIGS. 2a,b illustrate a normal to a cone vertex, FIGS. 3a,b,c show illustrations for determining the node point normal taking the surface weighting into account.
Figure 2A:
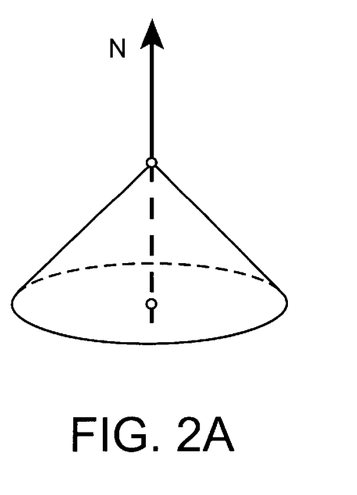
Figure 2B:
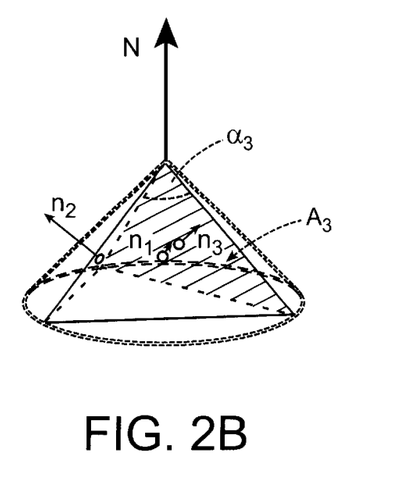

As a further variable in Equation 2, the normal vector $\vec{N}_i$ to a base node point will be calculated. Although the normal direction $\vec{N}_i$ to a base node point of a surface forming an FE mesh is not defined, since the point cannot be mathematically differentiated, the normal vector $\vec{N}_i$ can be approximately calculated, through a weighted summation, by means of the normal vectors $\vec{n}_j$ of the adjoining surfaces (cf. FIGS. 1 and 2). This weighted, accumulated mean of the surface normals defines the normal vector to a base node point $\vec{P}_i$, as can be seen from FIGS. 2a and b. FIG. 2a shows the formation of a normal vector to a cone vertex and FIG. 2b shows the formation of a normal vector to an equilateral pyramid.

The normal vector $\vec{n}_j$ of the adjoining surface element j $$\vec{n}_j = \frac{(\vec{k}_{j+1} \times \vec{k}_j)}{|\vec{k}_{j+1} \times \vec{k}_j|} \quad \text{(Eq. 4)}$$

and the tangential vectors $\vec{k}_j$, $\vec{k}_{j+1}$ of the surface element j $$\vec{k}_j = \vec{P}_j - \vec{P}_i, \text{ where } i \neq j \quad \text{(Eq. 5)}$$

and the weighting $\alpha_j$ $$\alpha_j = \arccos\left(\frac{\vec{k}_{j+1} \cdot \vec{k}_j}{|\vec{k}_{j+1} \cdot \vec{k}_j|}\right) \quad \text{(Eq. 6)}$$

results in the normal vector $\vec{N}_i$ to the base node point $\vec{P}_i$.

The summing of the product of weighting factor $\alpha_j$ with the normal vector $\vec{n}_j$ of the surface element j which bears against the base node point $\vec{P}_i$ over all the adjoining surfaces, where $\vec{K}_j$, $\vec{K}_{j+1}$ describes the tangential vectors of the adjoining surfaces j, results in the normal vector $\vec{N}_i$.

The apex angle $\alpha_j$ of the adjoining surfaces j is selected as the weighting for the individual normal vectors $\vec{n}_j$. The apex angle is defined by the two side edges $\vec{K}_j$ and $\vec{K}_{j+1}$ of the adjoining surface, which edges meet at the node point $\vec{P}_i$. In the examples shown in FIG. 2b, the apex angle $\alpha_3$ for the surface component $A_3$ is indicated purely for reasons of clarity.

Figure 3A:
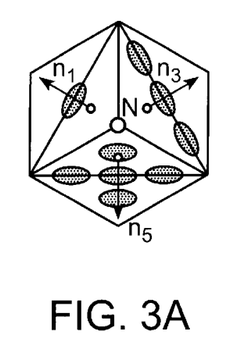
Figure 3B:
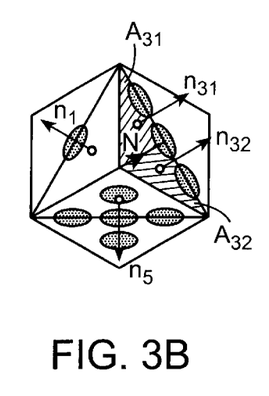
Figure 3C:
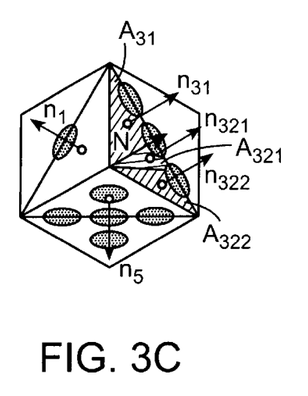

The apex angle $\alpha_j$ represents a suitable measure for the component formed by the surface $A_j$ bearing against the point. If the normal vector $\vec{n}_j$ were to be weighted with a dimension of the surface area of $A_j$, on the other hand, elongate surfaces would be too heavily weighted, as can be seen from FIGS. 3a to c. FIGS. 3a to c show various specific cases for possible surface combinations which each lead to different forms of normal vectors $\vec{N}_i$. FIG. 3a illustrates the case of an equilateral pyramid. The normal vector $\vec{N}_i$ is in this case directed perpendicularly upward. In FIG. 3b, the original surface $A_3$ is divided into two separate surfaces $A_{31}$, and $A_{32}$. It can clearly be seen that the normal vector is inclined slightly in the direction of surfaces $A_{31}$ and $A_{32}$, due to the changed surface weighting. A similar observation applies to the case illustrated in FIG. 3c. The result of this surface weighting provides unusable results.

The following example is intended to represent the calculation method for normal vectors $\vec{n}_1$ of the surface which is defined by the three points $\vec{P}_1$, $\vec{P}_2$ and $\vec{P}_3$:

$$\vec{n}_1 = \frac{\vec{k}_1 \times \vec{k}_2}{|\vec{k}_1 \times \vec{k}_2|} \qquad \text{(Eq. 7)}$$

where $$\vec{K}_1 \vec{P}_1 - \vec{P}_2 \qquad \text{(Eq. 7a)}$$

and $$\vec{K}_2 = \vec{P}_1 - \vec{P}_3. \qquad \text{(Eq. 7b)}$$

where $\vec{k}_1 = \vec{P}_1 - \vec{P}_2$ and $\vec{k}_2 = \vec{P}_1 - \vec{P}_3$.

As the last missing variable required for calculation of the shell mold thickness, the curvature $K_i$ at the node point $\vec{P}_i$, which is present in Equation 2 for determining the shell vector $\vec{S}_i$, has to be calculated. The local thickness $D_i$ at the node point $\vec{P}_i$ is established by experimental investigation of the thickness as a function of the curvature. $K_i$ describes the mean curvature at the node point $\vec{P}_i$, which is dealt with in the following section.

The following conventions are to be observed for the further explanations:

The thickness of the shell mold must be no less than zero ($D(K_i) \geq 0$)

If the surface around $\vec{P}_i$ is planar, the thickness of the shell mold has to correspond to a mean mold shell thickness. The same also applies to surfaces on which the curvatures are balanced in various directions, as may be the case, for example, for saddle points.

The thickness of the mold shell must not exceed a maximum value.

The calculation of the curvature is explained in the following section.

The calculation of the mean angle between the surface normal $\vec{N}_i$ at the point $\vec{P}_i$ and the adjoining edges $\vec{K}_j$ constitutes a simple form of representing the curvature. For this purpose, the apex angle $\beta_j$ between surface normal $\vec{N}_i$ and adjoining edges $\vec{K}_j$ is summed with a weighting $\alpha_j$. The sum of the apex angles between the edges $\angle \vec{K}_{j+1}, \vec{K}_j$ and $\angle \vec{K}_{j-1}, \vec{K}_j$ is selected as the weighting $\alpha_j$. This concept is similar to the concept of the apex angle weighting involved in the calculation of the surface normals $\vec{N}_i$ at the point $\vec{P}_i$.

The following equation applies:

$$K_i = \frac{\sum_j \alpha_j \beta_j}{\sum_j \alpha_j} \qquad \text{(Eq. 8)}$$

Summation over all adjoining tangential vectors $\vec{K}_j$ at the base node point $\vec{P}_i$ with the weighting $\alpha_j$ $$\alpha_j = \arccos\left(\frac{\vec{k}_{j+1} \cdot \vec{k}_j}{|\vec{k}_{j+1} \cdot \vec{k}_j|}\right) + \arccos\left(\frac{\vec{k}_{j-1} \cdot \vec{k}_j}{|\vec{k}_{j-1} \cdot \vec{k}_j|}\right) \qquad \text{(Eq. 9)}$$

and the angle $\beta_j$ between $\vec{N}_i$ and $\vec{K}_j$ $$\beta_j = \arccos\left(\frac{\vec{k}_j \cdot \vec{N}_i}{|\vec{k}_j \cdot \vec{N}_i|}\right) \qquad \text{(Eq. 10)}$$

Once the normal vector $\vec{N}_i$ and the curvature $K_i$ in the node point $\vec{P}_i$ are known, it is possible to form the shell vector $\vec{S}_i$, which is a precondition for determination of a surface element which can also be arranged perpendicular to and at a distance from the shell node point and which forms the surface of a layer of the shell mold.

The weightings required for determination off the normal vector $\vec{N}_i$ and the curvature $K_i$ can also be determined from other mesh parameters adjoining the node point $\vec{P}_i$.

Figure 4:
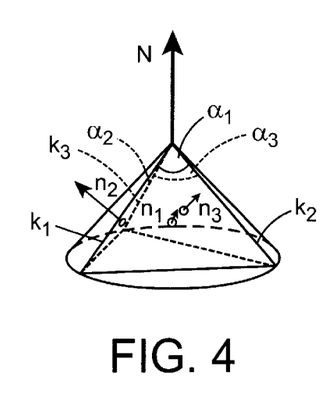
FIG. 4 shows an illustration for calculating the curvature at a point.

Referring now to FIG. 4, all the important parameters for calculation of the curvature at a node point $\vec{P}_i$ are illustrated once again using the example of three surfaces which abut one another at the point $\vec{P}_i$. The determination requires, on the one hand, the edge vectors $\vec{K}_1$, $\vec{K}_2$ and $\vec{K}_3$, as well as the apex angles $\alpha_1$, $\alpha_2$, $\alpha_3$ and the individual normal vectors $\vec{n}_1$, $\vec{n}_2$ and $\vec{n}_3$. Using the above mentioned Equation 3, the normal vector $\vec{N}_i$ can be determined from these values. Moreover, the curvature characteristics $\vec{K}_i$ can be determined using Equation 8.

Figure 5:
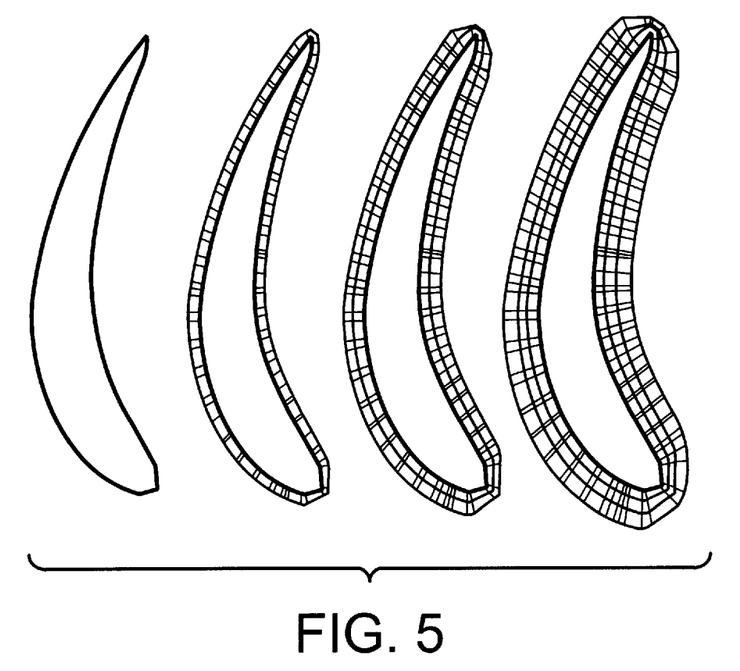
FIG. 5 shows an illustration for generating a 4-layer shell mold.

FIG. 5 shows the formation of a four-layer shell mold using the Mapped Mesher method. The main blade of a real turbine blade has been used for producing an FE mesh and is shown in cross section. A four-layer shell mold has been generated on this main blade using the Mapped Mesher method (right-hand illustration). It can be seen that the curvature of the turbine blade surface is reflected in different thicknesses of the shell mold. On the outflow edge of the turbine blade, only thin shell mold elements are generated due to the convex surface, while in the concave area of the main blade (left-hand side of the blade), the shell mold is thicker than the predetermined mean shell mold thickness of 14 mm.

The transition of the shell mold between concave and convex areas of the main blade is not sufficiently described by the rough mesh produced from the blade. An improvement is achieved by taking into account more than only the closest neighbors during the calculation of the curvature. This is achieved by producing the shell mold in a number of iteration steps. As a result, the curvature of surfaces which are not in direct contact is taken into account.

Figure 6:
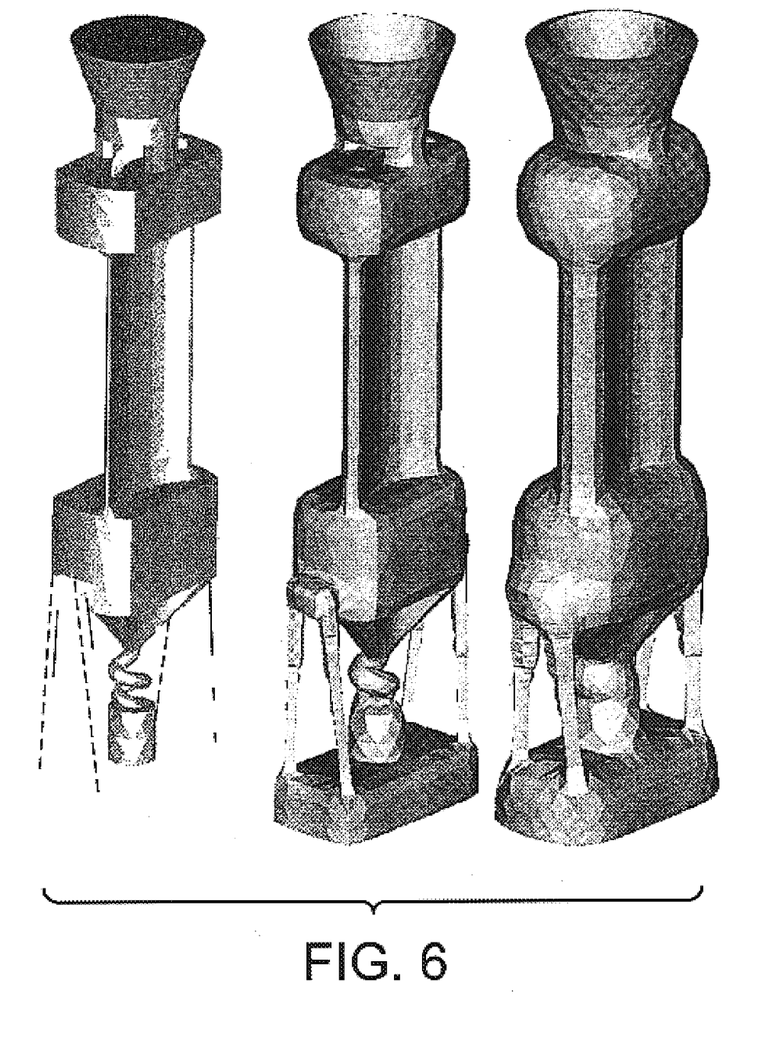
FIG. 6 shows illustrations demonstrating the growth of a shell mold for a turbine blade, FIGS. 7a,b show defective volume elements in the generation of volume elements in concave recesses of a shell mold using the Mapped Mesher method, FIGS. 8a,b,c,d show illustrations relating to a correction and recognition method for defective shell mold elements which are unusable for finite element analysis.

FIG. 6 shows the growth of the shell mold on dummy turbine blade, from the left to the right. In particular the critical areas of the shell mold, i.e. the helix in the lower area of the blade and the opening beneath the funnel are generated exactly by the shell mold generator. The three stages of generation of the shell mold clearly show how the shell mold is generated iteratively, so that a plurality of layers of FE meshes have to be generated above one another in the form of an onion-skin structure in order to complete a shell mold.

Figure 7A:
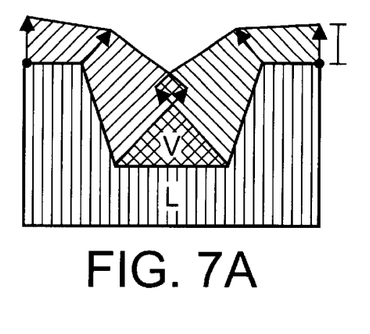
Figure 7B:
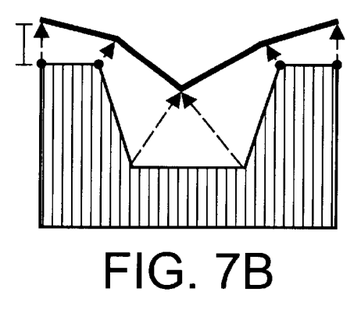

As has already been stated in the list of objectives, it is also to be possible, during the generation of surface elements or volume elements on the surface of the casting, to establish whether the individual elements overlap one another and are thus unsuitable for the further development of the shell mold. Thus, in the Free Surface Model, in the case of surfaces with a considerable concave curvature, it is taken into account that surfaces which overlap one another, as is the case in FIG. 7a, have to be eliminated during the formation of surface elements. For this reason, the shell mold surface is generated iteratively in a plurality of steps. If too few iteration steps are selected for the generation of a shell mold, the result will be defective surface elements which have to be detected and eliminated. FIG. 7a shows shell mold elements which were produced in one step. It can be seen that the adjoining elements penetrate through element V (dark shading) and that the latter is irregular in shape. Thus the element V cannot be used for finite element simulation. In this case, generation of surface elements using the Free Mesher Method is to be preferred, since in this method surface elements can be corrected or eliminated (cf. FIG. 7b).

Figure 8A:
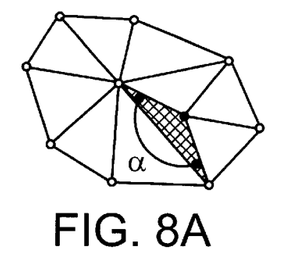
Figure 8B:
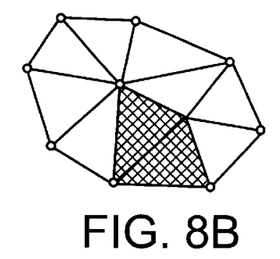
Figure 8C:
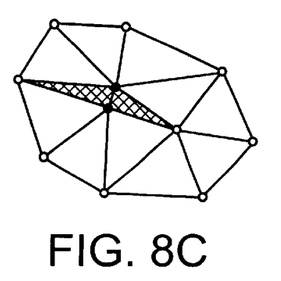
Figure 8D:
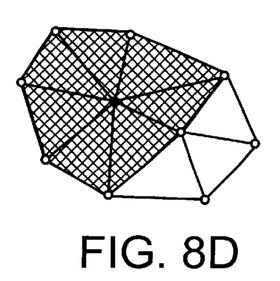

The local edge length and the surface internal angle are used as analysis criteria for defective elements. If surfaces with excessively large or small internal angles or side lengths are formed, node points are eliminated or surfaces are rearranged (cf. FIGS. 8a–d). This method is only used for the Free Mesh Method and eliminates excessively acute or obtuse internal angles (cf. FIGS. 8a, b) by redividing adjacent elements. If node points of surface elements lie close together, they are combined as a result of excessively small or large internal angles (cf. FIGS. 8c–d). In this case, account is taken of whether adjacent surface elements were also deformed by the elimination step. In this case, the analysis and correction step is repeated iteratively until all the surface elements of the area surrounding the combined point have a regular shape.

Obviously, numerous modifications and variations of the present invention are possible in light of the above teachings. It is therefore to be understood that within the scope of the appended claims, the invention may be practiced otherwise than as specifically described herein.

What is claimed:

1. A method for generating a shell mold for a casting, the method comprising:

recording a real surface geometry of the casting;

generating a coherent base mesh based on the real surface geometry, the coherent base mesh composed of surface elements connected by base node points and defining an interior surface of the shell mold;

generating a shell vector for each base node point, wherein the shell vector is oriented perpendicular to a pseudo-tangential plane at the respective base node point, the shell vector has a length generated as a function of curvature characteristics of the base mesh at the base node point and the shell vector ends at a shell node point, and wherein the length of the shell vector corresponds to a distance to a first surface element which is positioned above each base node point and in each case defines a volume element which, together with all other volume elements, forms a first layer of the shell mold;

generating a shell mesh based on the shell node points;

generating a subsequent shell vector for each shell node point, wherein the subsequent shell vector is oriented perpendicular to the respective shell node point, the subsequent shell vector has a length generated as a function of curvature characteristics of the shell mesh at the shell node point, and the subsequent shell vector ends at a subsequent shell node point, and wherein the length of the subsequent shell vector corresponds to a distance to a subsequent surface element which is positioned above each shell node point and in each case defines a subsequent volume element which, together with all other subsequent volume elements, forms a subsequent layer of the shell mold; and interactively repeating the generation of the shell mesh and the generation of the subsequent shell vector to form a desired number of subsequent layers of the shell mold resulting in a predetermined final thickness of the shell mold, wherein the shell mold is described from a multiplicity of finite volume elements and/or surface elements which are connected to one another via base node points or shell node points and which describe the surface of the shell mold, wherein curvature characteristics of the base mesh at the base node point are determined by summing an apex angle between a surface normal and adjoining edges and by applying a weighting factor based on an arc cos function of tangential vectors.

2. The method as claimed in claim 1, wherein the shell node point for each node point of the base mesh is determined as follows:

$$\vec{P}_{si} = \vec{P}_i + \vec{S}_i$$

where $\vec{P}_i$ is the base node point on the casting or iteratively produced base mesh $\vec{S}_i$ is the shell vector $\vec{P}_{si}$ is the shell node point.

3. The method as claimed in claim 2, wherein the following relationship is used to determine the shell vector which is normal to the surface of the casting at the node point P:

$$\vec{S}_i = D(K_i)\vec{N}_i$$

where $\vec{K}_i$ is the curvature of the shell mold $D(K_i)$ is the thickness of the shell mold as a function of the curvature $\vec{N}_i$ normal vector from the base node point $\vec{P}_i$ the normal vector $\vec{N}_i$ being determined by weighted summing over all normal vectors $\vec{n}_j$ which are defined by the surface elements bearing against the node point $\vec{P}_i$.

4. The method as claimed in claim 3, wherein the normal vector $\vec{N}_i$ at the node point $\vec{P}_i$ is given by the following relationship:

$$\vec{N}_i = \frac{\sum_j \gamma_j \vec{n}_j}{\left|\sum_j \gamma_j \vec{n}_j\right|}$$

summing is carried out over all surfaces j which bear against the base node point $\vec{P}_i$ with surface normal vector $$\vec{n}_j = \frac{(\vec{k}_{j+1} \times \vec{k}_j)}{|\vec{k}_{j+1} \times \vec{k}_j|}$$

with tangential vectors $\vec{k}_j$, $\vec{k}_{j+1}$ on surface element j $$\vec{k}_j = \vec{P}_j - \vec{P}_i, \text{ where } i \neq j,$$

and weighting $\gamma_j$ $$\gamma_j = \arccos\left(\frac{\vec{k}_{j+1} \cdot \vec{k}_j}{|\vec{k}_{j+1}||\vec{k}_j|}\right).$$

5. The method as claimed in claim 3, wherein a relationship for determining curvature characteristics of the base mesh at the base node point by summing the apex angle between the surface normal and adjoining edges is given by $K_i$:

$$K_i = \frac{\sum_j \epsilon_j \beta_j}{\sum_j \epsilon_j}$$

with weighting $\epsilon_j$ $$\epsilon_j = \arccos\left(\frac{\vec{k}_{j+1} \cdot \vec{k}_j}{|\vec{k}_{j+1}||\vec{k}_j|}\right) + \arccos\left(\frac{\vec{k}_{j+1} \cdot \vec{k}_j}{|\vec{k}_{j-1}||\vec{k}_j|}\right)$$

and angle $\beta_j$ between normal vector $\vec{N}_i$ at node point $\vec{P}_i$ and $\vec{k}_j$ $$\beta_j = \arccos\left(\frac{\vec{k}_j \cdot \vec{N}_i}{|\vec{k}_j||\vec{N}_i|}\right)$$

with tangential vectors $\vec{k}_j$, $\vec{k}_{j-1}$ on surface element j $$\vec{k}_j = \vec{P}_j - \vec{P}_i, \text{ where } i \neq j.$$

6. A method for generating a shell mold for a casting, the method comprising:

recording a real surface geometry of the casting;

generating a coherent base mesh based on the real surface geometry, the coherent base mesh composed of surface elements connected by base node points and defining an interior surface of the shell mold;

generating a shell vector for each base node point, wherein the shell vector is oriented perpendicular to a pseudo-tangential plane at the respective base node point, the shell vector has a length generated as a function of curvature characteristics of the base mesh at the base node point and the shell vector ends at a shell node point, and wherein the length of the shell vector corresponds to a distance to a first surface element which is positioned above each base node point which, together with all other first surface elements, forms a first layer of the shell mold;

correcting the first layer of the shell mold based on a local edge length of the adjacent surface elements and/or a surface internal angle of the adjacent surface elements;

generating a shell mesh based on the shell node points of the corrected first layer;

generating a subsequent shell vector for each shell node point, wherein the subsequent shell vector is oriented perpendicular to the respective shell node point, the subsequent shell vector has a length generated as a function of curvature characteristics of the shell mesh at the shell node point, and the subsequent shell vector ends at a subsequent shell node point, and wherein the length of the subsequent shell vector corresponds to a distance to a subsequent surface element which is positioned above each shell node point which, together with all other subsequent surface elements, forms a subsequent layer of the shell mold; and correcting the first layer of the shell mold based on a local edge length of the adjacent surface elements and/or a surface internal angle of the adjacent surface elements;

repeating the generation of the shell mesh, the generation of the subsequent shell vector and the correction of the shell mesh to form a desired number of subsequent layers of the shell mold resulting in a predetermined final thickness of the shell mold, wherein the shell mold is described from a multiplicity of finite volume elements and/or surface elements which are connected to one another via base node points or shell node points and which together describe the surface of the shell mold, wherein curvature characteristics of the base mesh at the base node point are determined by summing an apex angle between a surface normal and adjoining edges and by applying a weighting factor based on an arc cos function of tangential vectors.

7. The method as claimed in claim 6, wherein correcting the first layer includes dividing adjacent surface elements to eliminate excessively acute or obtuse internal angles and/or combining adjacent shell node points such that all the surface elements of the area surrounding the combined point have a regular shape.

8. The method as claimed in claim 6, wherein the shell node point for each node point of the base mesh is determined as follows:

$$\vec{P}_{si} = \vec{P}_i + \vec{S}_i$$

where $\vec{P}_i$ is the base node point on the casting or iteratively produced base mesh $\vec{S}_i$ is the shell vector $\vec{P}_{si}$ is the shell node point.

9. The method as claimed in claim 8, wherein the following relationship is used to determine the shell vector which is normal to the surface of the casting at the node point P:

$$\vec{S}_i = D(K_i)\vec{N}_i$$

where $\vec{K}_i$ is the curvature of the shell mold $D(K_i)$ is the thickness of the shell mold as a function of the curvature $\vec{N}_i$ normal vector from the base node point $\vec{P}_i$ the normal vector $\vec{N}_i$ being determined by weighted summing over all normal vectors $\vec{n}_j$ which are defined by the surface elements bearing against the node point $\vec{P}_i$.

10. The method as claimed in claim 9, wherein the normal vector $\vec{N}_i$ at the node point $\vec{P}_i$ is given by the following relationship:

$$\vec{N}_i = \frac{\sum_j \gamma_j \vec{n}_j}{\left|\sum_j \gamma_j \vec{n}_j\right|}$$

summing is carried out over all surfaces j which bear against the base node point $\vec{P}_i$ with surface normal vector $$\vec{n}_j = \frac{(\vec{k}_{j+1} \times \vec{k}_j)}{|\vec{k}_{j+1} \times \vec{k}_j|}$$

with tangential vectors $\vec{k}_j$, $\vec{k}_{j+1}$ on surface element j $\vec{k}_j = \vec{P}_j - \vec{P}_i$, where $i \neq j$ and weighting $\gamma_j$ $$\gamma_j = \arccos\left(\frac{\vec{k}_{j+1} \cdot \vec{k}_j}{|\vec{k}_{j+1}||\vec{k}_j|}\right).$$

11. The method as claimed in claim 9, wherein a relationship for determining curvature characteristics of the base mesh at the base node point by summing the apex angle between the surface normal and adjoining edges is given $K_i$:

$$K_i = \frac{\sum_j \epsilon_j \beta_j}{\sum_j \epsilon_j}$$

with weighting $\epsilon_j$ $$\epsilon_j = \arccos\left(\frac{\vec{k}_{j+1} \cdot \vec{k}_j}{|\vec{k}_{j+1}||\vec{k}_j|}\right) + \arccos\left(\frac{\vec{k}_{j+1} \cdot \vec{k}_j}{|\vec{k}_{j-1}||\vec{k}_j|}\right)$$

and angle $\beta_j$ between normal vector $\vec{N}_i$ at node point $\vec{P}_i$ and $\vec{k}_j$ $$\beta_j = \arccos\left(\frac{\vec{k}_j \cdot \vec{N}_i}{|\vec{k}_j||\vec{N}_i|}\right)$$

with tangential vectors $\vec{k}_j$, $\vec{k}_{j+1}$ on surface element j $\vec{k}_j = \vec{P}_j - \vec{P}_i$, where $i \neq j$.

* * * * *